Figure 1:
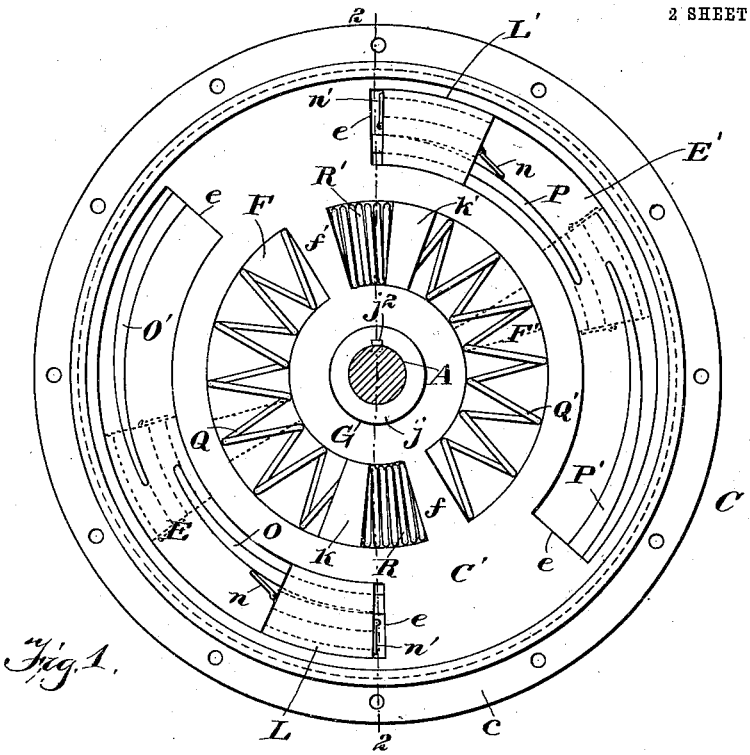

J. F. RADERS.
COMPENSATING DEVICE.
APPLICATION FILED MAR. 24, 1905.

986,498.

Patented Mar. 14, 1911.

2 SHEETS—SHEET 1.

WITNESSES:
Robert Head
V. E. Nichols

INVENTOR
Joseph F. Raders,
BY
Griffin & Bernhard
ATTORNEYS

J. F. RADERS.
COMPENSATING DEVICE.
APPLICATION FILED MAR. 24, 1905.

986,498.

Patented Mar. 14, 1911.

2 SHEETS—SHEET 2.

WITNESSES:
Robert Head
V. E. Nichols.

INVENTOR
Joseph F. Raders,
BY
Griffin & Bernhard,
ATTORNEYS

UNITED STATES PATENT OFFICE.

JOSEPH F. RADERS, OF NEW YORK, N. Y., ASSIGNOR OF ONE-HALF TO A. R. BRANDLY, OF NEW YORK, N. Y.

COMPENSATING DEVICE.

986,498. Specification of Letters Patent. Patented Mar. 14, 1911.

Application filed March 24, 1905. Serial No. 251,805.

*To all whom it may concern:*

Be it known that I, JOSEPH F. RADERS, a citizen of the United States, residing at New York, borough of Manhattan, in the county of New York and State of New York, have invented certain new and useful Improvements in Compensating Devices, of which the following is a specification.

My invention relates to what may be termed a "compensating device," the same being intended for use in connection with a driving part and a driven part for the purpose of taking up or absorbing vibrations due to the operation of the driving part.

One adaptation of my invention is in connection with an internal combustion engine wherein the piston or pistons are reciprocated by the energy developed by the ignition of charges of combustible vapor. The new device is associated with the engine shaft and with a driven part, such as a gear or sprocket; said device operating to absorb the pulsations or somewhat irregular motion of the engine shaft due to the action of the piston or pistons thereon and to insure uniformity or regularity in the rotation of the driven part, such as the gear.

My invention consists in the employment of fluid-operated means between the driving and driven parts for absorbing the pulsations of the driving part. Said fluid-actuated means comprises a casing or driven member rotatable with the driven part and provided with one or more fluid chambers, a driving member rotatable with the driving part and provided with a piston or pistons arranged to work in said fluid chamber or chambers, and means whereby the passage of the fluid through the piston or pistons is regulated and controlled on the movement of the driving member relative to the casing or the driven member.

In one embodiment of the invention the piston has a liquid passage extending through the same, and in this passage is adapted to operate a tapering rod or stem which, as the piston moves over the rod, gradually reduces or throttles the passage so as to check the flow of liquid through the piston, and thereby overcome sudden or jerking movements of the parts.

The device is constructed to secure the desired operation on the rotation of the driving and driven parts in either direction, and it also embodies means for maintaining the working parts normally in a position to respond instantly to the rotation of the driving part when operated in either direction.

Furthermore, my device is adapted for use in connection with reciprocating machinery, as well as rotary machines or engines; in fact, the new device is adapted for use generally as a cushioned transmission mechanism, it being, broadly stated, a mechanical movement or power transmission apparatus.

Reference is to be had to the accompanying drawings, forming a part of this specification, wherein like characters of reference are used to indicate corresponding parts in the several figures.

Figure 2:
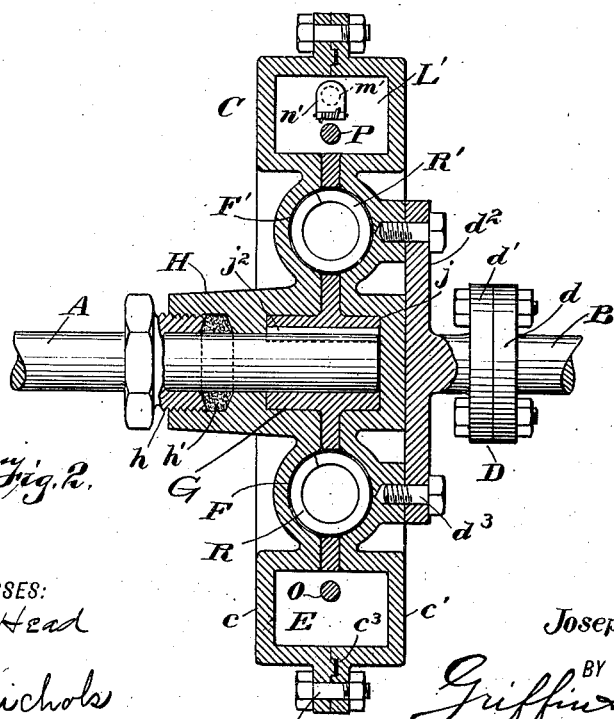
Figure 3:
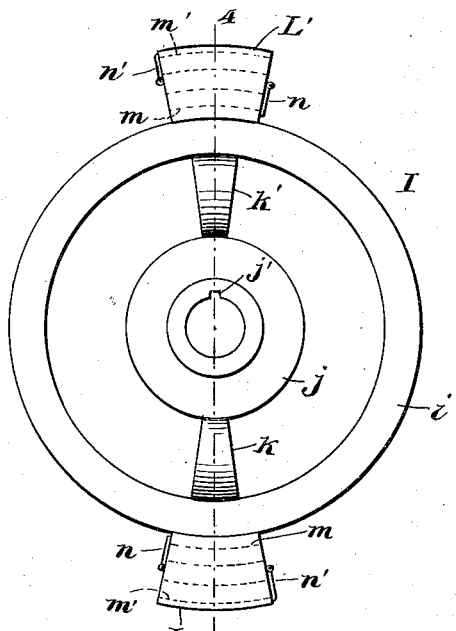
Figure 4:
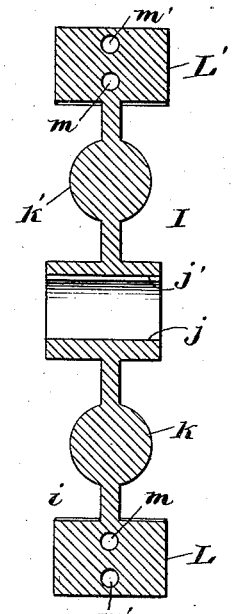
Figure 5:
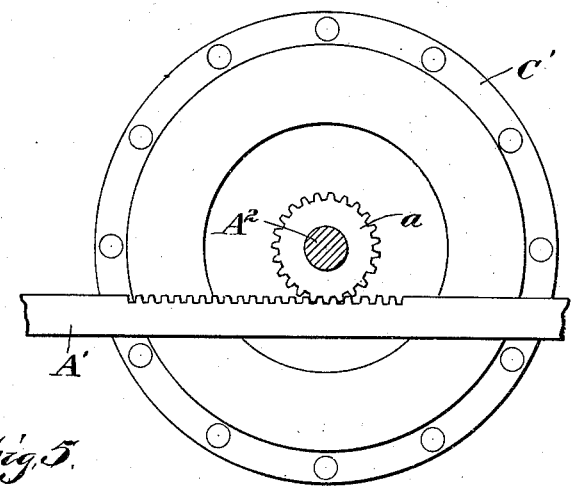

Figure 1 is a view in side elevation of my improved compensating or transmission device, a part of the casing being removed and the shaft being shown in transverse section, the pistons and springs being represented in abnormal positions by full lines and the pistons in normal positions by dotted lines. Fig. 2 is a vertical transverse section on the plane indicated by the dotted line 2—2 of Fig. 1. Fig. 3 is a detail view in side elevation of the driving member removed from the driven member or casing. Fig. 4 is a transverse section through the driving member on the line 4—4 of Fig. 3. Fig. 5 is a view in side elevation of my transmission device in connection with a reciprocating driving part.

In Figs. 1 and 2 of the drawings I have shown my improved compensating or transmission device in connection with rotating, driving and driven parts, the same being indicated at A, B, respectively. The driving part A may be the shaft of an engine of the class known as "explosive", "internal combustion" or "gas engines", wherein the piston or pistons are driven by the energy developed by the ignition of charges of combustible vapor, the result of which is that the shaft is not driven steadily and uniformly, but has pulsations given thereto. It is intended that the part B shall be rotated uniformly and steadily, and this part B may rotate any suitable shaft adapted to transmit the motion of the engine to appropriate machinery, such as the driving mechanism of an automobile or the propeller shaft of a motor-driven marine vessel. As shown by Fig. 2, the driven part B is disposed in coaxial relation to the driving part A, although these two parts are entirely independent of each other, and between said parts I interpose my compensating or transmission mechanism which is adapted to absorb the pulsations of the part A and to transmit the motion steadily and uniformly from said part A to the part B.

One member of my transmission or compensating mechanism is a casing C, that is intended to be made fast or secured rigidly to the driven part B, so that this casing becomes, in effect, the driven member of the transmission or compensating device. This casing is shown by the drawings as consisting of the complemental sections $c\ c'$, which are flanged to have lapping engagement and are united solidly one to the other by bolts $c^2$ or their equivalents, suitable packings $c^3$ lying between the lapping parts of the casing so as to minimize leakage and escape of the fluid adapted to be contained within the transmission device. The casing C, as an entirety, is secured to the driven part B by any suitable or appropriate connection which is herein shown as a coupling D, the same being constructed of face plates bolted together, one of said face plates $d$ being integral with the driven part B, while the other face plate $d'$ is made in one piece with a larger face plate $d^2$, which is bolted as at $d^3$ to the section $c'$ of the casing or driving member C.

The complemental sections $c\ c'$ of the casing C are each cast in a single piece, and they are of such form that when the two sections are assembled they form or produce the piston chambers E E', the spring chambers F F', and a hub chamber G. Each section $c$ or $c'$ of the casing C has a web C', in which is produced the chambers E E', F, F', each chamber being of arcuate or segmental shape, shown more particularly by Fig. 1. Each piston chamber is adapted to contain a suitable fluid, such as oil, glycerin, or the like, the end walls of each chamber E E' being indicated at $e$ in Fig. 1. The spring chambers F F' in the webs C' of the complemental casing sections lie between the fluid or piston chambers E E', and the hub chamber G, and said spring chambers F F' are separated one from the other by the partitions or abutments $f\ f'$, also shown by Fig. 1. The section $c$ of the casing is provided with a central sleeve H, the same being in alinement with the hub chamber G and adapted to fit loosely on the driving part A. Said sleeve H is chambered for the reception of a gland $h$, which is adapted to compress a packing $h'$ contained in the sleeve H, whereby the gland $h$ may be screwed into the sleeve so as to produce a tight stuffing box for the purpose of minimizing the leakage of fluid from the transmission device.

The driving member of my compensating or transmission device is represented in detail by Figs. 3 and 4 of the drawings, the same being indicated in its entirety by the reference character I. Said driving device comprises a ring or annulus $i$, a hub $j$ and the abutments $k\ k'$, said abutments being located radially between the ring and the hub, all of the parts being cast in a single piece. The driving member is equipped with pistons L L', the same being located outside of the ring $i$ and at diametrically opposite points. These pistons are fast with the driving member, by being made in one piece therewith or by attaching said pistons in a suitable way to said ring $i$. The pistons are fashioned to fit snugly in the fluid chambers E E' of the casing C, and said pistons may be oblong to snugly fit said chambers, as shown by the piston L' fitting in the chamber E' in Fig. 2, or if desired the chambers and the pistons may be substantially circular in cross section, as will be readily understood. Each piston L L' is shown as having two bypass passages indicated in dotted lines by $m,\ m'$, and said piston is equipped with appropriate check valves $n\ n'$, the check valves for each piston being located at the respective ends thereof and adapted to individually close the by passes $m\ m'$, according as the piston moves in one direction or the other with the driving member I.

The driving member I is arranged within the casing or driven member C for the hub $j$ of said member I to occupy the chamber G, the abutments $k\ k'$ work in the spring chambers F F', and the pistons L L' operate in the fluid chambers E E', respectively, as shown by Figs. 1 and 2. The hub $j$ of the driving member I fits on the inner end portion of the driving part or shaft A, and this hub has a key seat $j'$, adapted to receive a key $j^2$ for the purpose of making the driving member I fast with the driving part A, as in Figs. 1 and 2, whereby the driving member I is secured rigidly and directly to the driving part A for the purpose of rotating therewith.

In each fluid chamber E E' are the throttling devices by which the passage of fluid through the piston is controlled or regulated on a movement of the driving member and the pistons relative to the driven member. In the chamber E are the tapering rods O O', which are of arcuate form and project from the respective end walls $e$ of said chamber, said rods being arranged out of alinement with each other and having their smaller ends terminating in lapping order. Similar rods P P' are arranged in the other chamber E'. The rods O O' are adapted to coöperate with the piston L, so as to work in the passages $m\ m'$, while the rods P P' operate in conjunction with the passages $m\ m'$ of the other piston L'.

Q Q' and R R' designate coiled springs which are disposed in the chambers F F'. The springs Q Q' operate between the abutments $k\ f'$ and $f\ k'$, while the springs R R' are seated against the abutments $k\ f$ and $k'\ f'$, respectively. These springs are of equal tension so as to hold the driving member and its pistons normally in a position indicated by dotted lines in Fig. 1, wherein the pistons L L' are midway of the respective chambers E E', so that the tapering rods O O' and P P' will enter the passages in the pistons L L', respectively, the valves $n\ n'$ of said pistons being closed. In this normal position of the parts the pistons are adapted to move easily in the chambers E E', in one direction or the other, according as the driving member I may be moved by the driving part A in one direction or the other. Assuming, however, that the driving member I is moved to the right or to the full line position shown in Fig. 1, the pistons L L' travel over the rods O, P, the valves $n$, being opened and the valves $n'$ being closed. As the pistons move from their normal positions to their full line positions and with the passages $m'$ of said pistons being closed by the valves $n'$, the tapering form of the rods O, P, gradually reduce the area of the passages $m$ in said pistons, and thereby throttle the passage of liquid through the pistons, in consequence of which the movement of the pistons L L' is gradually checked or retarded, so as to compress the fluid between the pistons and the end walls $e$, and thereby take up the jar or pulsation on the driving part, and communicate the motion to the driven part in a steady or uniform manner. It will be evident that the movement of the driving member I in the opposite direction will make the tapering rods O' P' operate in conjunction with the pistons and the passages $m'$ thereof, in which event the valves $n$ will be closed while the valves $n'$ will be opened. The movement of the pistons in this direction will compress the other set of springs Q Q', and make the pistons travel over the rods O' P', thus throttling the fluid and making the driving member I transmit the motion steadily and uniformly to the driven member C.

Although I have shown and described my compensating or transmission device in connection with a rotary driving part A, I would have it understood that said device may be used in connection with a reciprocating driving or driven member, as in Fig. 5. The driving member is indicated at A' in the form of a rack, the teeth of which mesh with a pinion $a$ on the shaft $A^2$. This shaft is adapted to carry the driving member I, and it operates with a driven member or casing C', the parts being constructed and adapted for operation in the same way as the transmission devices heretofore described in connection with rotary driving and driven parts.

Having thus described my invention, what I claim as new and desire to secure by Letters Patent is:—

1. A device of the class described comprising an annular chambered member adapted to contain a fluid, a driving member concentric with said chambered member and having a piston working in said chamber, and means for throttling the passage of fluid through the piston.

2. A device of the class described, comprising an annular chambered driven member adapted to contain a fluid, a driving member having a plurality of pistons operating in separate chambers of said annular member, means for maintaining the pistons of the driving member in normal positions within said chambers when the parts are at rest, and means for throttling the passage of fluid through each of said pistons.

3. A device of the class described comprising a chambered driven member adapted to contain a fluid, a driving member having a piston adapted to operate in either direction in said chamber, means for maintaining the piston normally in a position in said chamber for operation in either direction therein, and means for automatically throttling the flow of fluid through the piston on its movement in either direction.

4. A device of the class described comprising a driven member having a divided fluid chamber, a driving member provided with pistons adapted to operate in the parts of said chamber, and means for throttling the flow of fluid through the pistons in the respective parts of the chamber on a relative movement of the driving and driven members.

5. In a device of the class described, driving and driven shafts, a revoluble driven member having independent liquid chambers, said member being concentric to and fast with the driven shaft, a revoluble driving member fast with the driving shaft and provided with valved pistons arranged to operate in the respective chambers of the driven member, and means for throttling the passage of liquid through the respective pistons by a relative rotary movement of the driving and driven members.

6. The combination of a driven member having a fluid chamber, a driving piston movable in an arcuate path in said chamber, said piston having a plurality of fluid passages, a valve for each passage in the piston, and a plurality of tapering members adapted to operate in the respective passages of the piston, each valve being adapted to be opened by one of said tapering members.

7. The combination of a driven member having a fluid chamber, a driving piston movable in an arcuate path in said chamber, valves for individually controlling the fluid passages in the piston, and a plurality of tapering members adapted to operate in the respective passages of the piston.

8. The combination of a revoluble casing having a fluid-chamber, a member provided with a piston operating in said chamber, means for maintaining the piston normally centrally of the chamber, and fluid throttling devices coöperating with the piston on its movement in either direction within the chamber.

9. The combination of driving and driven shafts, a revoluble chambered casing fast with one of the shafts, a member fast with the other shaft and provided with a piston which operates in said chamber, springs acting on said member for maintaining the piston in a position for movement lengthwise of said chamber and in either direction therein, and throttling devices for controlling the flow of fluid through the piston on a relative movement of the member to the casing.

10. The combination of a revoluble chambered casing, a revoluble member having a piston adapted to operate in said chamber, said piston being provided with a fluid passage, a tapering member adapted to operate in said passage of the piston, and separate springs arranged to move the rotatable piston member in opposite directions.

11. The combination of a revoluble chambered casing, a revoluble member having a piston adapted to operate in said chamber, said piston being provided with a plurality of fluid passages and with valves for closing the individual passages, and tapering members adapted to operate in the respective passages.

12. The combination of a revoluble member having fluid chambers, a member provided with pistons operating in the respective chambers, each piston having a liquid passage, and tapering members in the respective chambers and coöperating with the passages in the pistons thereof.

13. The combination of a revoluble member having fluid chambers, a member provided with pistons operating in the respective chambers, each piston having separate valved passages, and a plurality of tapering members in the respective chambers, said members in each chamber operating in conjunction with the respective passages of the piston therein.

14. The combination of a revoluble member having fluid chambers, a member provided with pistons operating in the respective chambers, each piston having a liquid passage, tapering members in the respective chambers and coöperating with the passages in the pistons thereof, and springs acting on the second named member to maintain the pistons in the chambers for movement back and forth therein.

15. In a device of the class described, a driving shaft, a driven shaft, a liquid containing member carried by one shaft and provided with separate piston chambers, a member on the other shaft, valved pistons working in said piston chambers and movable with the second member, and tapering rods for throttling the circulation of liquid in said member and pistons.

In testimony whereof I have signed my name to this specification in the presence of two subscribing witnesses.

JOSEPH F. RADERS.

Witnesses:
H. F. BERNHARD,
JAS. H. GRIFFIN.